United States Patent [19]

Moran

[11] 4,161,761

[45] Jul. 17, 1979

[54] PROPORTIONAL GROUND CURRENT RELAY

[75] Inventor: Richard J. Moran, Milwaukee, Wis.

[73] Assignee: McGraw-Edison Company, Elgin, Ill.

[21] Appl. No.: 830,653

[22] Filed: Sep. 6, 1977

[51] Int. Cl.² .............................................. H02H 3/08
[52] U.S. Cl. ........................................ 361/94; 361/98
[58] Field of Search ...................... 361/98, 96, 97, 94, 361/195, 196; 307/293, 294

[56] References Cited

U.S. PATENT DOCUMENTS

| | | | |
|---|---|---|---|
| 3,345,539 | 10/1967 | Ashenden et al. | 361/97 |
| 3,434,011 | 3/1969 | Zocholl | 361/96 |
| 3,689,801 | 9/1972 | Engel et al. | 361/96 |
| 3,956,670 | 5/1976 | Shimp et al. | 361/98 |
| 4,027,203 | 5/1977 | Moran et al. | 361/98 |
| 4,060,844 | 11/1977 | Davis et al. | 361/96 |

*Primary Examiner*—Patrick R. Salce
*Attorney, Agent, or Firm*—Thomas E. McDonald; Jon C. Gealow; Ronald J. LaPorte

[57] ABSTRACT

The minimum instantaneous voltage output of a phase resistor connected to receive the rectified phase and neutral currents of three wye-connected current transformers, magnetically coupled to respective phase conductors of a three phase electric power circuit, is proportional to the peak current of the phase conductor carrying the center magnitude phase current. A voltage proportional to this minimum instantaneous voltage is measured and stored by a capacitor each cycle. The peak instantaneous voltage output of a ground resistor connected to receive the full wave rectified output of three, parallel-connected current transformers, also coupled to respective phase conductors of the power circuit, is proportional to the peak ground current of the electric power circuit. A voltage proportional to the voltage output of the ground resistor is applied to the base of a NPN transistor, and the voltage stored by the capacitor is applied to the emitter of this transistor, to turn on this transistor every time the peak ground current exceeds a preselected percentage of the center magnitude phase current. The momentary turnon of this transistor at least once every current cycle activates a timing circuit, which after a predetermined time, initiates tripping of a circuit interrupter.

17 Claims, 15 Drawing Figures

PROPORTIONAL GROUND CURRENT RELAY

BACKGROUND OF THE INVENTION

1. Field of Invention

The invention relates generally to circuits for detecting ground overcurrent conditions in a three phase electric power circuit, and, more particularly, to a circuit for detecting a ground current of a three phase electric power circuit which exceeds a predetermined percentage of the three phase load current level of this circuit.

2. Prior Art

In known ground overcurrent protective relaying circuits for a three phase electric power system, such as that disclosed in my U.S. Pat. No. 4,027,203, issued May 31, 1977, the minimum ground overcurrent pickup is a fixed current value, which must be selected to be greater than the ground currrent which will flow in the electric power circuit during maximum load current conditions and maximum relative unbalance between the three phase currents. Consequently, high resistance ground faults below this fixed minimum ground pickup current level can remain undetected by these known ground overcurrent protection circuits. Studies have indicated that about one-third of the ground faults on three phase electric power distribution lines are not cleared by any protective device on the line.

SUMMARY OF THE INVENTION

Therefore, it is a primary objective of the invention to provide a ground overcurrent protective circuit which is picked up whenever the ground current exceeds a selected percentage of the three phase load current level, so long as the ground current exceeds a predetermined minimum fixed value of current.

It is another object of the invention to provide a load current detection circuit, coupled to a three phase alternating power system, which provides a continuous direct voltage reference signal proportional to the center magnitude current of the three phase AC phase currents of the power system.

It is a further object of the invention to provide an output signal circuit, connected to receive the direct voltage reference signal proportional to the median phase current and a second direct voltage signal proportional to the power system ground current produced by a known ground current sensing circuit, which produces an output signal whenever the system ground current exceeds a selected percentage of the median phase current.

The phase and neutral terminals of three wye-connected current transformers, magnetically coupled to respective phase conductor of a three phase electric power circuit, are connected to respective phase and neutral AC input terminals of an eight diode, three phase, rectifier bridge similar to that described in my co-pending U.S. patent application, Ser. No. 780,815 filed Mar. 24, 1977. A phase current sensing resistor is connected in series with the power supply capacitor across the positive and negative potential output terminals of the phase rectifier bridge, and a zener diode is connected across the power supply capacitor to define a low impedance path after the capacitor has been charged to a selected power supply voltage. A first PNP transistor has its base connected to the positive potential power supply line at the junction between the current sensing resistor and the power supply capacitor, its collector connected through a second resistor to the negative potential supply line, and its emitter connected through a high value resistor to the positive potential output terminals of the phase rectifier bridge. The current flow through the emitter resistance will be proportional to the current flow through, and the voltage drop across, the phase current sensing resistor. Also, since the first transistor is connected in a common base configuration, the current flow through its collector resistor will be approximately equal to the current flow through its emitter resistor, and thus the voltage across the first transistor collector resistor will be proportional to the current flow through the phase current sensing resistor.

The secondary windings of three additional current transformers, also magnetically coupled to respective phase conductors of the three phase power line, are connected in parallel across the AC inputs of a full wave, single phase, rectifier ground bridge. A ground current sensing resistor is connected between the positive potential DC output terminal of the ground rectifier bridge and the positive potential supply line, and the negative potential DC terminal of the ground rectifier bridge is connected to the negative potential DC power supply line and the negative output terminals of the phase rectifier bridge. The second PNP transistor is connected in a manner similar to the first transistor, with its base connected to the positive power supply line, its collector connected through a resistor to the negative power supply line, and its emitter connected through a high impedance resistor to the positive DC output of the single phase ground rectifier bridge. Thus the voltage drop across the collector resistor of the second transistor will be proportional to the current flow through the ground current sensing resistor.

A third PNP transistor has its base connected to the collector of the first transistor, its collector connected through a resistor to the negative power supply line, and its emitter connected to the positive power supply line through a second capacitor having a high value discharge resistor connected across it. Thus, whenever the collector voltage of the first transistor decreases, as a result of a decrease in the current flow through the phase current sensing resistor, to a level less than the voltage level maintained at the emitter of the third transistor by the second capacitor, this third transistor turns on to quickly charge the second capacitor until the emitter voltage of the third transistor is approximately equal to the collector voltage of the first transistor. The capacitor discharge resistor is chosen to be of such a value that the charge on the second capacitor is retained for at least a half current cycle, so that the voltage at the emitter of the third transistor, relative to the negative supply line, is proportional to the minimum level of current flowing through the phase current sensing resistor each current cycle.

A fourth NPN transistor has its base connected to the collector of the second transistor, and its emitter connected to the emitter of the third transistor. This transistor will be turned on whenever the instantaneous voltage drop across the collector resistor of the second transistor, which is proportional to the instantaneous ground current flowing in the three phase power system, is greater than the voltage at the emitter of the third transistor, which is approximately equal to the minimum instantaneous voltage drop across the collector resistor of the first transistor occurring at least twice each current cycle and stored by the second capacitor, or to the minimum instantaneous current flowing through the phase current sensing resistor each current cycle. A momentary turnon of this fourth transistor at least once each current cycle initiates a timing circuit which, after a predetermined time delay, actuates the tripping mechanism of a circuit interrupter.

When the three phase load current level increases, the capacitor discharge resistor allows the second capacitor to discharge slowly until it is again reading the minimum voltage across the collector resistor of the first transistor correctly. The time delay of the ground timing circuit must exceed the time required for the second capacitor to respond to an increase in phase current.

As explained in detail in the above referenced U.S. patent application Ser. No. 780,815, the voltage produced across the phase current sensing resistor by the flow of current therethrough will be proportional to the instantaneous sum of one polarity of the power line phase and neutral currents. Assuming sinusoidal current wave forms, when the three phase currents are spaced approximately 120 degrees apart, the minimum instantaneous current flowing through the phase current sensing resistor each current cycle will be equal to 0.866 (Sin 120°) times the peak value of the center magnitude phase current. Thus if the value of the emitter resistor of the first transistor is selected to be equal to the value of the emitter resistor of the second transistor, and the collector resistor of the second transistor is selected to be approximately 0.866 times the value of the collector resistor of the first transistor, the fourth transistor will be turned on momentarily whenever the ground current of the three phase power circuit exceeds a percentage of the peak value of the center magnitude phase current, with this percentage being determined by the ratio of the phase current resistor to the ground sensing resistor.

Further objects and advantages will become more apparent from the following detailed description of the invention, taken in conjunction with the drawings.

DESCRIPTION OF A PREFERRED EMBODIMENT

Figure 1:
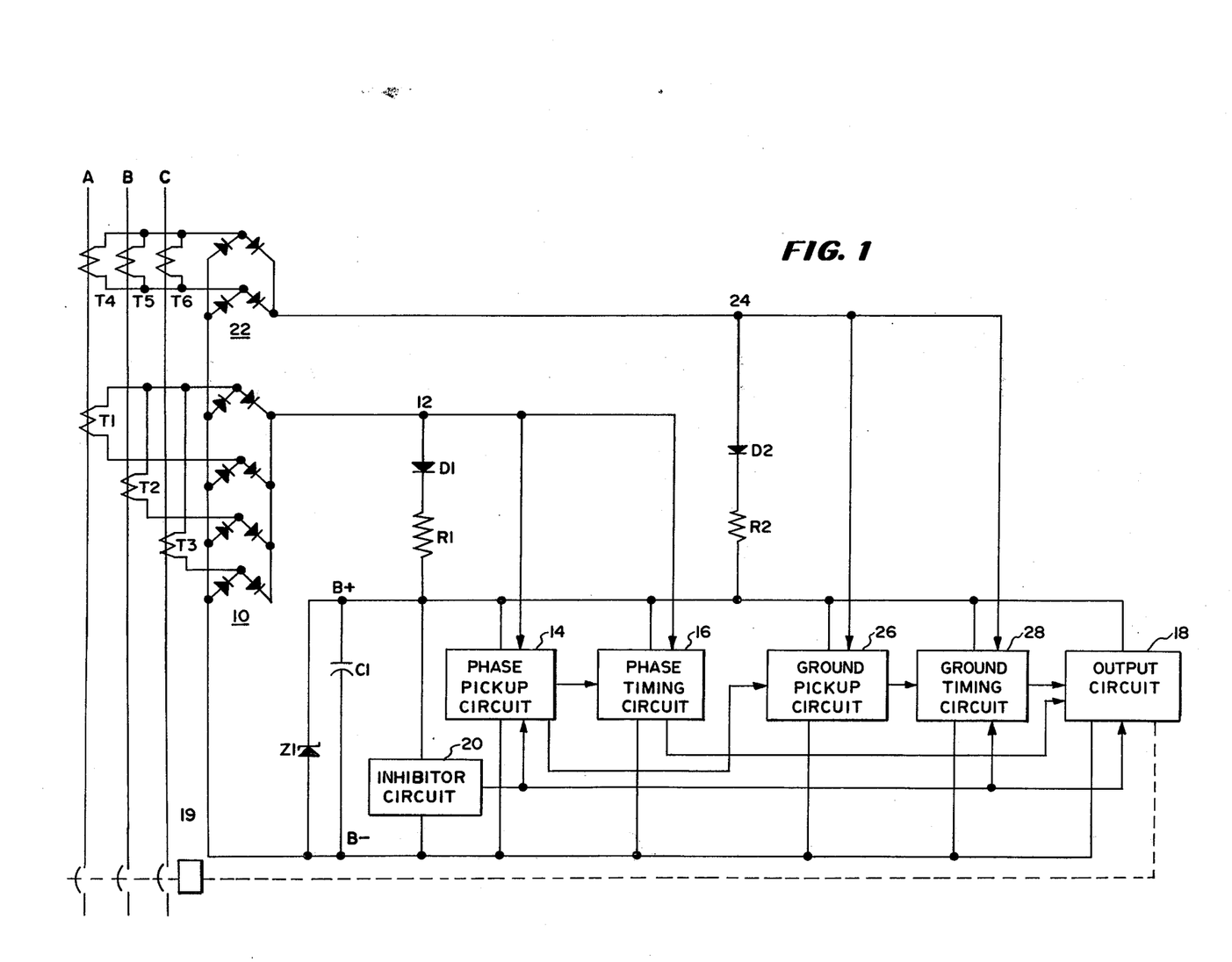
FIG. 1 is a schematic diagram, partially in block form, of a preferred embodiment of the invention.

The block diagram of FIG. 1 illustrates a control circuit for a three phase circuit interrupter, similar to that disclosed in previously referenced U.S. Patent application Ser. No. 780,815. Three current transformers T1, T2, T3, are magnetically coupled to respective phase lines A, B, C, of a three phase electric power circuit. The secondary windings of the three current transformers T1, T2, T3 are wye-connected, with their neutral and phase terminals being connected to supply current to an eight diode, three phase, rectifier bridge 10, also described in the above referenced U.S. patent application Ser. No. 780,815. One end of a phase current sensing resistor R1 is connected through a diode D1 to the positive potential DC output 12 of the phase rectifier bridge 10, and the other end of the phase current sensing resistor R1 is connected to the positive side B+ of a power supply capacitor C1. The negative side B− of the power supply capacitor C1 is connected to the negative potential DC output of the phase rectifier bridge 10, and a zener diode Z1 is connected across the power supply outputs B+, B− of the capacitor C1. Thus, the positive polarity portion of the phase and ground currents $I_a$, $I_b$, $I_c$, $I_n$, induced in the secondary windings of the current transformers T1, T2, T3 by line currents flowing in phase lines A, B, C of the electric power circuit, are rectified in the phase rectifier bridge 10 and used to charge the power supply capacitor C1. After the power supply capacitor C1 has been charged to its rated voltage of about 18 volts, the zener diode Z1 connected across the power supply C1 defines a low impedance path, and thus maintains the sensing network functioning as a current source. As explained in the above mentioned U.S. patent application Ser. No. 780,815, the phase current sensing resistor R1 will produce a peak voltage proportional to a peak phase current of the electric power circuit at least once every half cycle. Upon the occurrence of a predetermined minimum voltage across the resistor R1 indicating a phase overload condition, a phase pickup circuit 14 activates a phase timing circuit 16, which, after a time delay proportional to the peak voltage output of the resistor R1, actuates an output circuit 18 which trips a circuit interrupter 19. An inhibitor circuit 20 prevents operation of the phase pickup circuit 14 and the output circuit 18 until the power supply capacitor C1 is charged to an operational level. The operation of these phase, output, and inhibitor circuits 14, 16, 18, 20 are fully described in the referenced U.S. patent application Ser. No. 780,815 and hence will not be discussed in detail herein.

Three additional current transformers T4, T5, T6 are also magnetically coupled to respective phase lines A, B, C of the three phase electric power circuit. The secondary windings of these current transformers T4, T5, T6 are connected in parallel across the AC inputs of a single phase full wave rectifier bridge circuit 22. The positive potential DC output 24 of the ground rectifier bridge 22 is connected through a diode D2 and a ground, or neutral, current sensing resistor R2 to the B+ side of the power supply capacitor C1, and the negative potential DC output of the ground rectifier bridge 22 is connected to the negative potential DC output B− of the phase rectifier bridge 10. Thus the ground current sensing resistor R2 produces a peak voltage every half cycle proportional to the peak value of the ground current in the three phase electric power circuit. Upon the occurrence of a voltage output of the ground current sensing resistor R2 indicating a ground current in excess of a predetermined percentage of the three phase load current level, a ground pickup circuit 26 activates a ground timing circuit 28, which, after a predetermined time delay, activates the output circuit 18 to trip the circuit interrupter 19.

The output current $I_{12}$ of the phase rectifier bridge 10, and thus the voltage produced across the phase current sensing resistor R1, will be proportional to the instantaneous sum of one polarity of the power line phase and neutral currents. Assuming sinusoidal current wave forms, the minimum instantaneous value of the output current $I_{12}$ of the phase rectifier bridge 10 each cycle will be within a current range determined by the two largest of the three current values, each equal to the sine of the angles between the current vectors of two respective phases times the peak value of the smaller of the two phases.

Figure 2:
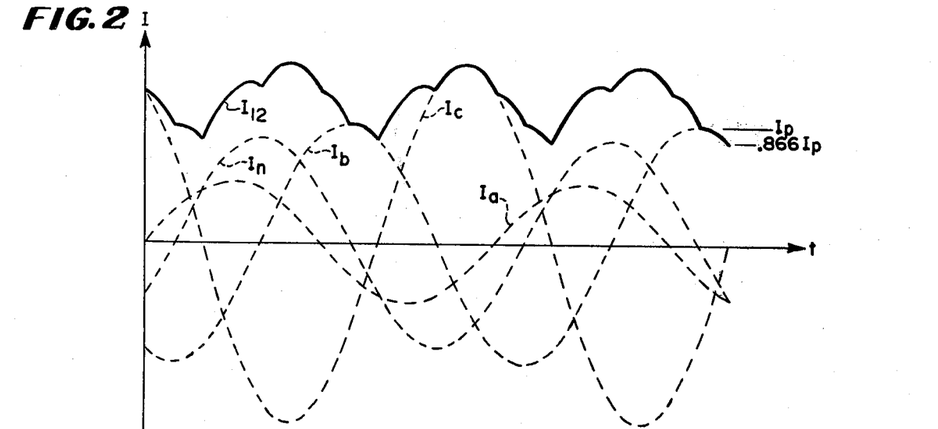
FIGS. 2–8 are graphic representations of the instantaneous input and output currents of the phase current rectifier bridge vs. time, for various power line conditions.

For three phase distribution lines in which the phase currents are spaced approximately 120 degrees apart, the minimum instantaneous value of the phase rectifier bridge output current $I_{12}$ will equal approximately 0.866 (Sin 120°) times the peak value $I_p$ of the center magnitude phase current of the three current transformer phase currents $I_a$, $I_b$, $I_c$, and will occur at least twice each current cycle, as illustrated in FIG. 2 for three phase currents $I_a$, $I_b$, $I_c$, having respective relative magnitudes of 1, 2 and 3.

Figure 3:
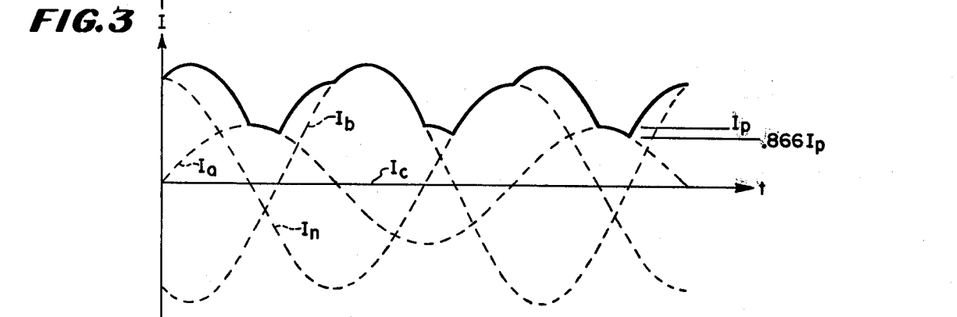
Figure 4:
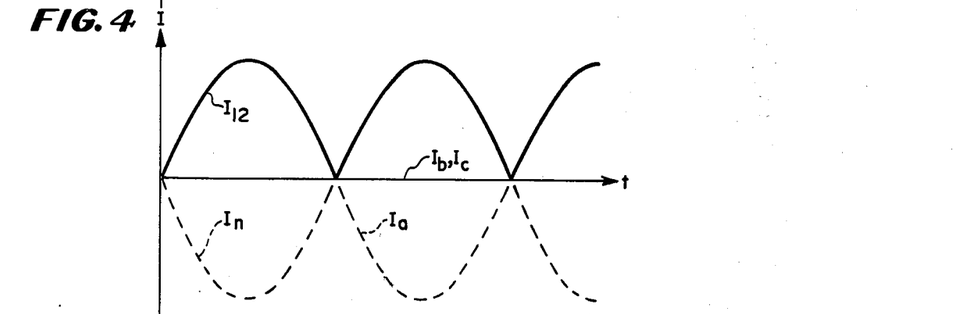
Figure 5:
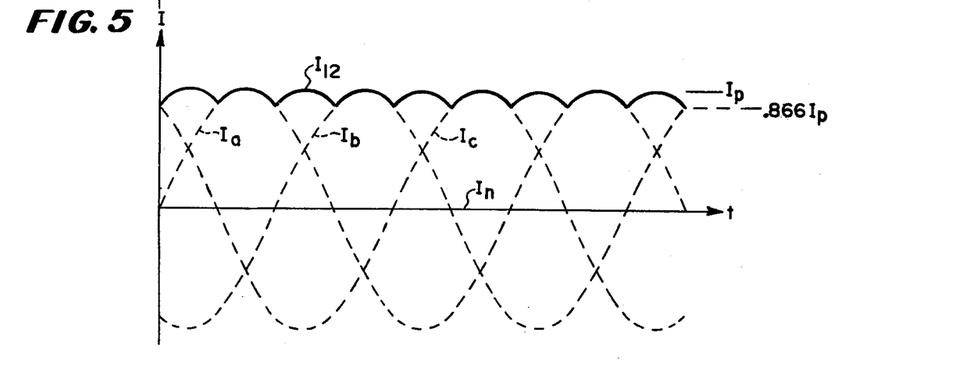

This 0.866 ratio of the minimum instantaneous value of the phase rectifier bridge output current $I_{12}$ to the peak value of the center magnitude phase current applies even when there is no current flow through one or two phase lines because of upline fault or open line conditions. In the example, shown in FIG. 3, the three phase currents $I_a$, $I_b$, $I_c$ have relative peak magnitudes of 2, 4 and 0, so the minimum instantaneous value of the phase rectifier bridge output current $I_{12}$ equals 0.866×2 or approximately 1.732. FIG. 4 illustrates the input and output currents of the phase rectifier bridge 10 for a line condition causing zero current flow through two of the three phases. Since the center magnitude phase current in this case is zero, the minimum instantaneous value of the phase rectifier bridge output current $I_{12}$ is also zero, and occurs every half cycle. However, when the three phase vector currents $I_a$, $I_b$, $I_c$ are of equal magnitude and displacement, the neutral current $I_n$ is zero and the minimum instantaneous value of the current $I_{12}$, equal to 0.866 times the peak value of the phase current $I_a$, $I_b$, or $I_c$, will occur six times each current cycle, as illustrated in FIG. 5.

Figure 6:
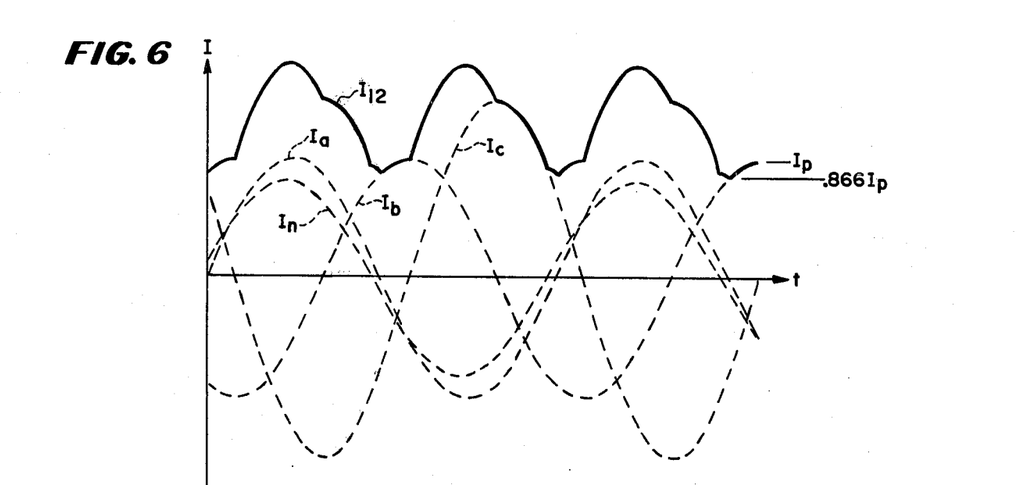
Figure 7:
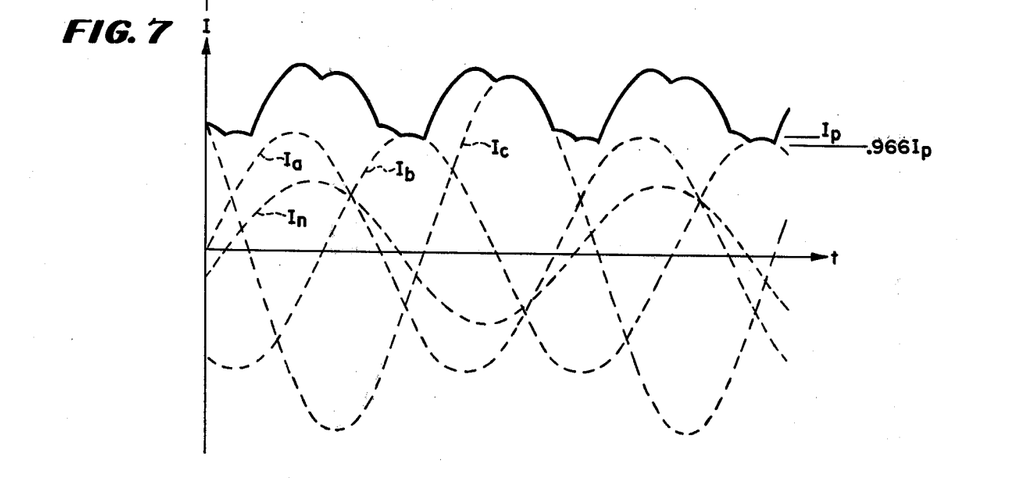

Since most of the loads of an electric power distribution circuit are resistive or inductive loads, each of the phase currents is either in phase with, or lags behind, its respective phase voltage. When a single line-to-ground fault occurs on a balanced three phase circuit feeding an inductive load, the current flowing through the faulted line can be displaced to lead the normal load current of this line where the nature of the line to ground fault is purely resistive. In such a case, the ratio of the minimum output of the phase rectifier bridge 10 to the peak phase output will either be 0.866, as shown in FIG. 6, or fall within the range of 0.866 to 1.0 as shown in FIG. 7, depending on the magnitude and phase angle of the fault current. FIG. 6 shows the input and output current wave forms of the phase rectifier bridge 10 in which a line-to-ground fault on phase C of the power line has increased the magnitude of the current in this phase by 50 percent over its normal load current magnitude, and has displaced this current $I_c$ by 30 degrees from its normal balanced condition so that it lags the current in phase B by only 90 degrees, rather than 120 degrees. In this case, the lowest instantaneous value of the output current $I_{12}$ of the phase rectifier bridge 10 will still equal 0.866 times the peak value of the normal load current $I_b$. However, if the phase current $I_c$ is only displaced 15 degrees from its normal balance condition so that it lags phase B by only 105 degrees, as shown in FIG. 7, the lowest instantaneous value of the phase rectifier bridge output current $I_{12}$ will be approximately 0.966 times the peak value of the normal load current $I_b$.

Figure 8:
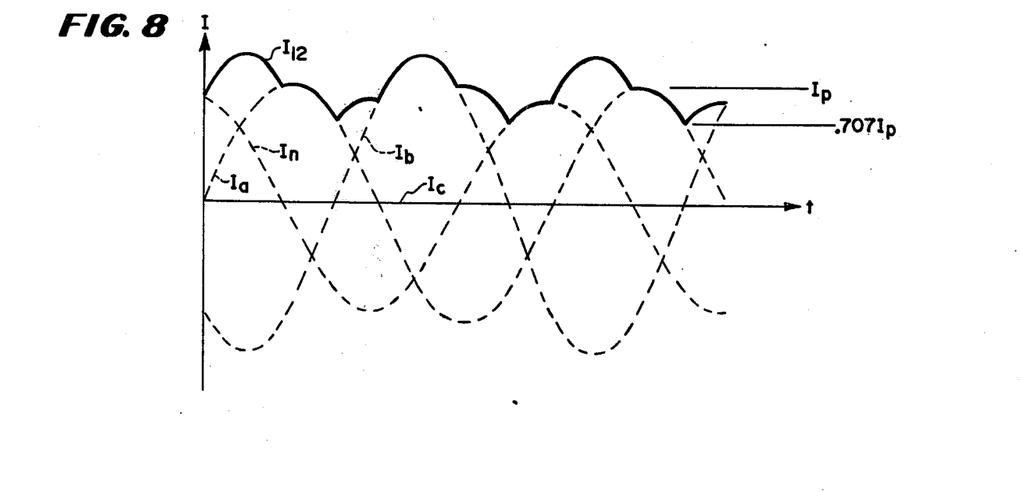

On a distribution line having a relatively large three phase motor load, if one of the phase lines is deenergized as a result of an upline fault or open circuit condition, single phasing of these three phase motors can occur, depending on the type of motors and distribution transformers connected to the power circuit. Such single phase operation of three phase motors can result in an angular displacement between the currents of the two energized phases of more than 120 degrees. In such a case, the minimum instantaneous value of the phase rectifier bridge output current $I_{12}$ will be equal to the sine of the angle between the two phase currents times the peak value of the lower of these two currents. This is illustrated in FIG. 8 in which the phase current $I_c$ is 0, the phase current $I_b$ is 20 percent greater than the phase current $I_a$, and the phase angle between current $I_a$ and $I_b$ is 135°. In such a case, the minimum instantaneous value of the phase rectifier bridge output current $I_{12}$ will be 0.707 (Sin 135°) times the peak value of the lower phase current $I_a$.

From the above discussion and examples, it is seen that the minimum instantaneous value of the phase rectifier bridge output current $I_{12}$ occurs at least twice every current cycle, and is approximately 0.866 times the peak value of the center magnitude phase current when the three phase currents are spaced 120° apart. Thus, if the minimum instantaneous voltage appearing across the resistor R5, which is directly proportional to the phase rectifier bridge output current $I_{12}$, is measured and stored each half cycle, this stored voltage can be used as a reference voltage to determine when the peak voltage across the resistor R10, which is proportional to the peak value of the ground current $I_n$, exceeds a predetermined percentage of the center magnitude phase current.

Figure 9:
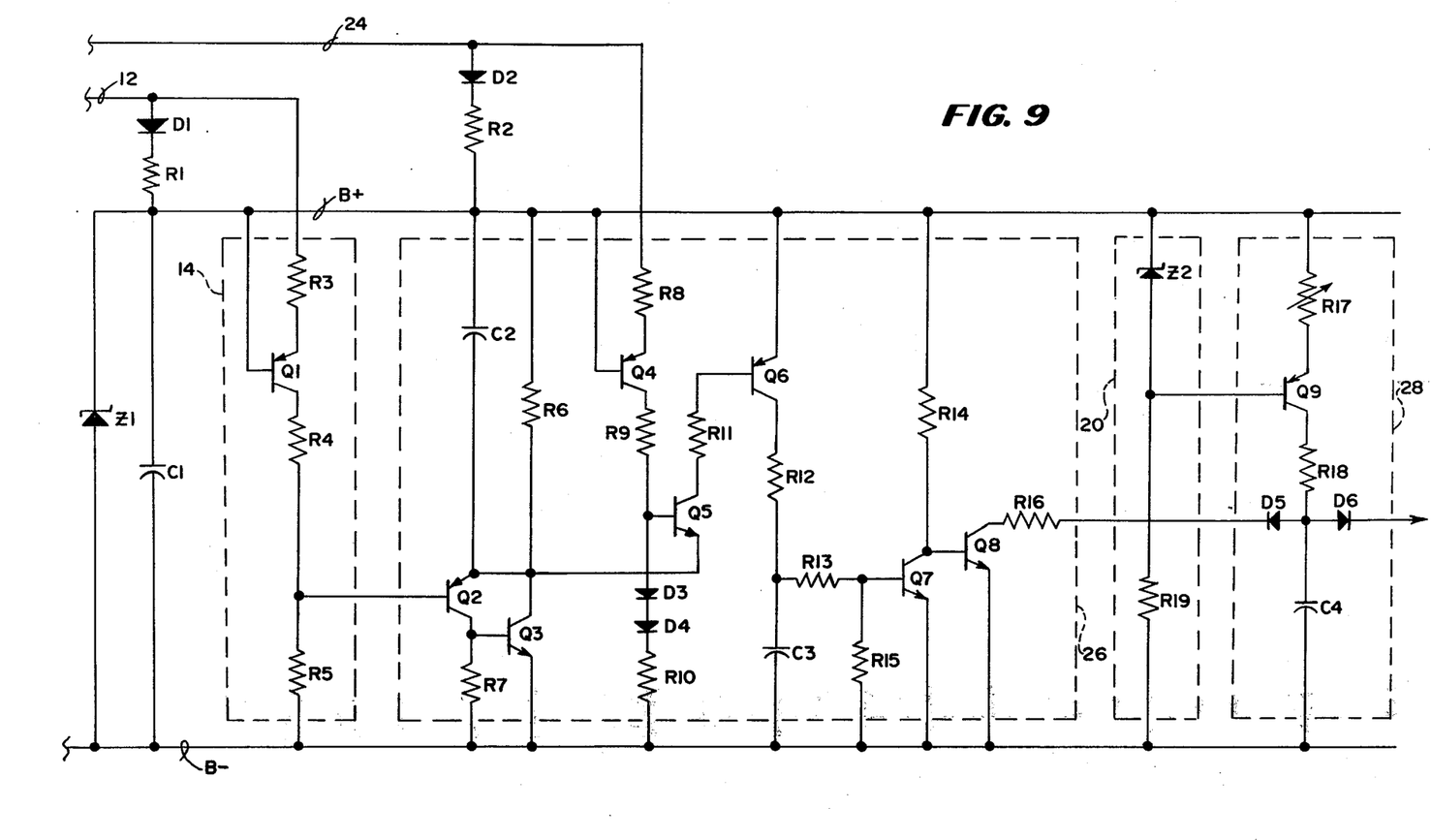
FIG. 9 is a more detailed schematic diagram of the embodiment of FIG. 1.

Referring now to FIG. 9, the phase pickup circuit 14 includes a phase overcurrent sensing PNP transistor Q1 which has its base connected to the B+ power supply line. The emitter of the transistor Q1 is connected in series with a voltage detection resistor R3 to the positive potential output line 12 of the phase rectifier bridge 10, and the collector is connected in series with the coupling resistors R4 and R5 to the B− power supply line. The value of the voltage detection resistor R3 is selected to be several orders of magnitude larger than the value of the phase current sensing resistor R1 so as not to appreciably affect the flow of current through, and the voltage drop across, the current sensing resistor R1. The voltage drop across the diode D1 in series with the current sensing resistor R1 compensates for the voltage drop between the emitter and base of the transistor Q1 so that the voltage drop across the voltage detection resistor R3 is substantially the same as the voltage drop across the current sensing resistor R1. The transistor Q1 is connected in a common base configuration such that its collector current will approximately equal its emitter current. Thus the current supply to, and the voltage drop developed across, the resistor R5 will be directly proportional to the output current $I_{12}$ of the phase rectifier bridge 10.

In the ground pickup circuit 26, another PNP transistor Q2 has its base connected to the junction of the resistors R4 and R5 in the phase pickup circuit 14. A reference voltage capacitor C2 and a high value resistor R6 connected in parallel with the reference voltage capacitor C2, are connected between the B+ power supply line and the emitter of the transistor Q2. The collector of the transistor Q2 is connected through a resistor R7 to the B− power supply line. Also an NPN transistor Q3 is connected in cascade with the transistor Q2, with the collector of the transistor Q3 being connected to the emitter of the transistor Q2, the base of the transistor Q3 being connected to the collector of the transistor Q2, and the emitter of the transistor Q3 being connected to the B− power supply line.

The reference voltage capacitor C2 thus stores a voltage related to the minimum instantaneous value of the voltage appearing across the resistor R5. Whenever the voltage appearing at the junction of the resistors R4 and R5 drops below the voltage impressed upon the emitter of the transistor Q2 by the reference voltage capacitor C2, the transistor Q2 turns on, causing the transistor Q3 to also turn on to thus quickly charge the reference voltage capacitor C2 to the value of the voltage at the junction of the resistors R4 and R5 relative to the B+ power supply line less the voltage drop between the emitter and base of the transistor Q2. The resistor R6 across the reference voltage capacitor C2 is of a high value so that the reference voltage capacitor C2 will retain most of its charge for at least a half cycle, until the minimum instantaneous voltage again appears at the junction of the resistors R4 and R5 to turn on the transistors Q2 and Q3 and again quickly charge the reference voltage capacitor C2. Thus, the voltage at the emitter of the transistor Q2 using the B− power supply line for reference is essentially maintained at a level equal to the minimum instantaneous voltage appearing across the resistor R5 each cycle plus the voltage drop across the emitter to base junction of the transistor Q2. During steady load current conditions, the transistors Q2 and Q3 will be turned on at least once every half cycle to maintain the correct value of charge on reference voltage capacitor C2. When the load current increases, the resistor R6 allows the reference voltage capacitor C2 to slowly discharge until the voltage at the emitter of the transistor Q2 again corresponds to the minimum instantaneous voltage across the resistor R5.

The ground pickup circuit 26 also includes a PNP transistor Q4 which has its base connected to the B+ power supply line, its emitter connected through a resistor R8 to the positive potential output line 24 of the ground rectifier bridge 22, and its collector connected in series through the resistor R9, the diodes D3, D4, and the resistor R10 to the B− power supply line. The resistor R8 is selected to be several orders of magnitude higher in value than the ground current sensing resistor R2 so that it does not appreciably affect the current flow through, and the voltage drop produced across, the current sensing resistor R2. The voltage drop across the diode D2 in series with the current sensing resistor R2 effectively compensates for the voltage drop from the emitter to the base of the transistor Q4, so that the voltage drop across the resistor R8 is substantially the same as the voltage drop across the ground current sensing resistor R2. The transistor Q4 is connected in a common base configuration so that its collector current will approximately equal its emitter current. Thus the voltage drop across the resistor R10 will be proportional to the ground current of the three phase electric power circuit. The resistor R8 is selected to be of the same value as the resistor R3 of the phase pickup circuit 14, so that the current flow through the resistor R10 of the ground pickup circuit 26 will be the same as the current flow through the resistor R5 of the phase pickup circuit 14 when the voltage drop across the ground current sensing resistor R2 is the same as the voltage drop across the phase current sensing resistor R1. The ground pickup circuit 26 also includes a NPN transistor Q5 whose base is connected to the junction between the resistor R9 and the diode D3, and whose emitter is connected to the emitter of the transistor Q2. Thus the voltage appearing at the emitter of the transistor Q5 is the minimum instantaneous voltage across the resistor R5 plus the voltage drop across the emitter-to-base junction of the transistor Q2, which is stored by the reference voltage capacitor C2. The peak voltage at the base of the transistor Q5 is the peak voltage across the resistor R10 plus the voltage drops across the diodes D3 and D4. These diodes D3, D4, are connected in series with the resistor R10 to compensate for the base-to-emitter voltage drop of the transistor Q5 and the emitter-to-base voltage drop of the transistor Q2. Thus, whenever the voltage across the resistor R10 is greater than the minimum instantaneous voltage per cycle across the resistor R5, the transistor Q5 will turn on momentarily. Since the minimum instantaneous voltage appearing across the resistor R5 at least once every cycle is generally proportional to 0.866 times the peak value of the phase load current, the resistor R10 is selected to have a value of resistance approximately 0.866 times the value of the resistor R5.

The ratio of the phase current sensing resistor R1 to the ground current sensing resistor R2 determines the unbalance current percentage at which ground pickup will occur. Thus when the resistor R1 is equal to resistor R2, the peak voltage appearing across the resistor R10 plus the voltage drops across the diodes D3 and D4 will equal the minimum instantaneous voltage appearing across resistor R5 plus the emitter-to-base voltage drop of the transistor Q2 and the base-to-emitter voltage drop of the transistor Q5 when the ground current is equal to the normal phase load current. If the ground current becomes greater than 100% of the phase load current, the transistor Q5 will turn on at least once each current cycle to activate the ground timing circuit 28. If the value of the ground current sensing resistor R2 is selected to be twice that of the phase current sensing resistor R1, that is the ratio of R1 to R2 is one-half, the transistor Q5 will be turned on at least once every cycle whenever the ground current exceeds fifty percent of the phase load current as indicated by the minimum instantaneous voltage across the resistor R5.

Thus the ground pickup circuit 26 can be set to operate when the ground current exceeds a selected percentage of the phase current down to a minimal ground current value determined by the resistors R6 and R5. The resistor R6 is a very high value resistor and thus forms a voltage divider through the transistor Q2 and the resistor R5 between the B+ and B− power supply lines. As such, there is a minimum voltage seen at the emitter of the transistor Q2 even when the load current is zero. The true relative ground unbalance pickup occurs for load levels between a predetermined minimal ground current pickup level and the phase overcurrent pickup value. Thus, when there is no current flow in two of the phase lines as a result of two open or faulted phases upline of the circuit interrupter, ground pickup will not occur unless the ground current exceeds this minimum current level.

The collector of the transistor Q5 is connected through a coupling resistor R11 to the base of a PNP transistor Q6, which has its emitter connected to the B+ power supply line and its collector connected in series with a resistor R12 and a hold-on capacitor C3 to the B− power supply line. A coupling resistor R13 connects the junction of the resistor R12 and the hold-on capacitor C3 to the base of a NPN transistor Q7 which has its emitter connected to ground and its collector connected to the B+ power supply line in series with the resistor R14. A bias resistor R15 is connected across the base to the emitter of the transistor Q7 and in series with the resistor R13 to the B− power supply lines. The time constant of the resistor R12 and the hold-on capacitor C3 is selected to provide a very rapid charging of the the hold-on capacitor C3, which then discharges through the resistor R13 and the base-to-emitter junction of the transistor Q7 in parallel with the resistor R15.

Whenever the ground current exceeds a selected percentage of phase current, the transistors Q5 and Q6 will be turned on during the peak periods of each current cycle. Such turnon rapidly charges the hold-on capacitor C3 so that it will maintain the transistor Q7 on until the next peak period of the following current cycle, and thus maintain a ground overcurrent signal as long as the hold-on capacitor C3 has recharged each cycle. For example, the discharge time of the hold-on capacitor C3 may be in the order of 20 milliseconds. If the hold-on capacitor C3 is not charged by the next succeeding cycle, the capacitor C3 will then completely discharge and turn off the transistor Q7 until a new peak current is sensed. The ground overcurrent output signal from the transistor Q7 is applied to the ground timing circuit 28, and in particular to the base of a normally conducting NPN transistor Q8 which is connected to hold the ground timing circuit 28 off. The emitter of the transistor Q8 is connected to the B− power supply line and the collector is connected through a limiting resistor R16 to the timing circuit 28. In the absence of conduction of the transistor Q7, the transistor Q8 receives turnon current through the resistor R14 and conducts. This resets and holds the timing circuit 28 in a standby or start position by discharging the timing circuit capacitor C4. When the transistor Q7 conducts, it bypasses input current from the transistor Q8 which turns off and permits the ground timing circuit 28 to initiate a timing cycle.

The ground timing circuit includes a PNP transistor Q9 which is connected in a common base configuration, with its emitter connected to the B+ power supply line through an adjustable resistor R17, its collector connected through a limiting resistor R18 and the timing capacitor C4 to the B− power supply line, and its base connected to the B+ power supply line through a zener diode Z2 in the inhibitor circuit 20. The resistor R19 connects the zener diode Z2 to the B− power supply line to maintain a snall bias current therethrough. Thus the transistor Q9 provides a constant timing current determined by the setting of the adjustable resistor R17 whenever the power supply capacitor C1 is at a voltage level sufficient to overcome the voltage of the zener diode Z2. During normal line conditions, the timing capacitor C4 will remain at a low state, since the timing current from the transistor Q9 will be bypassed to the B− power supply line through the blocking diode D5, the resistor R16, and the normally conducting transistor Q8. When a ground overcurrent condition occurs, the transistor Q8 will be turned off, and the timing capacitor C4 will start to charge at a rate determined by the setting of the variable resistor R17. When the timing capacitor C4 is charged to a sufficient level, a signal is supplied to actuate the output circuit 18 through a blocking diode D6, which serves to isolate the timing capacitor C4 of the ground timing circuit 28 from the RC timing network in the phase timing circuit 16. The value of the resistor R17 is selected to coordinate the charging rate of the timing reference voltage capacitor C4 with the discharge rate of the capacitor C2 through the resistor R6, so that the ground time delay always exceeds the time required for the reference voltage capacitor C2 to discharge through the resistor R6 when the phase current increases until the voltage of the capacitor C2 again correctly corresponds to the minimum voltage on the resistor R5.

If a shorter ground time delay is desired upon the occurence of a relatively large ground overcurrent, the voltage across the resistor R10 can be used to actuate a fixed value pickup circuit and a variable time delay circuit inversely proportional to the ground current, as described in the above referenced U.S. Pat. No. 4,027,203. These known fixed pickup and variable timing circuits can be used in conjunction with the variable pickup and fixed timing circuits, 26 and 28, described herein, to better coordinate with other circuit protective devices of the power system during relatively high ground overcurrent conditions, while still detecting very low ground fault conditions.

If a persistent, very low magnitude, ground fault occurs during a peak load period of the electric power system, it will not be detected until the load current had decreased to the point at which this very low magnitude ground overcurrent exceeds the preselected percentage of the load current. Thus, very low magnitude ground faults will only be detected, and the power circuit interrupted, during a off-peak period of time when there are few loads connected to the power circuit, and when a power interruption of the circuit results in less harm or inconvience to the electric power users.

When an open line condition or phase-to-ground fault occurs upline from the circuit interrupter 19, the system neutral current $I_n$ at the circuit interrupter 19 will equal the vectorial sum of the respective phase currents of the two energized lines. When these two phase currents are displaced at approximately 120°, the ground current will always be of a magnitude at least as great the smallest of the two phase currents, i.e., the median phase current, as illustrated in FIG. 3. The ground current can be somewhat lower than the median phase current where the two phase currents are spaced more than 120° apart, as illustrated in FIG. 8. However, in such a case, the ratio of the minimum instantaneous value of the phase rectifier bridge output current $I_{12}$ to the peak value of the median phase current will be equal to the sine of the angle between the two phase currents. Since this will always be less than 0.866 when the two phase currents are spaced more than 120° apart, the ground pickup circuit 26 will be activated at a lower percentage of the median phase current than that chosen to detect a downline phase-to-ground fault, so that the circuit interrupter will be tripped even when the ground current detection circuit is set to detect a relatively high system ground current.

Similarly, when two of the three phases upline from the circuit interrupter are open, the system ground current will equal the phase current of the sole energized phase line, and the ground pickup circuit 26 will be activated to initiate tripping of the circuit interrupter.

Thus the circuit interrupter will be tripped whenever one or two of the phase conductors are de-energized as a result of an upline fault or open line condition, or whenever a downline fault or open line condition causes the system ground current to exceed a preselected percentage of the median phase current.

A storage battery, or other DC power source, can be used instead of the power supply capacitor C1, so long as a voltage limiting device such as a non-linear voltage variable resistor is connected across the power supply terminals to maintain the current source, and, in the case of a rechargeable battery, to prevent overcharging the battery. Also, the emitter of the transistor Q6 can be connected behind the zener diode Z2, as described in the above referenced U.S. patent application Ser. No. 780,815, to prevent the operation of the ground pickup circuit 26 when the voltage through the power supply is below a selected operational level. If the transistor Q6 is so connected, a blocking diode should be added to the voltage restraint circuit 20 between the junction of the zener diode Z2 and the emitter of the transistor Q6, and the junction of the resistor R19 and the base of the transistor Q9 to electrically isolate these circuits, 20 and 26.

Figure 10:
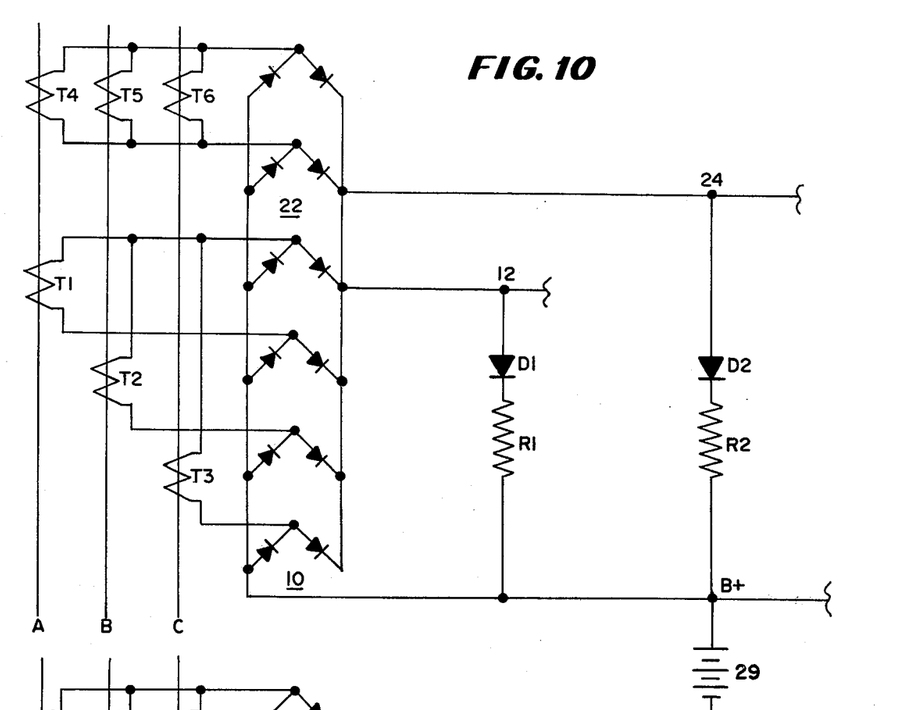
FIG. 10 is a schematic diagram, illustrating a modification of the circuit of FIG. 1.

When there is no need for the DC power source to be charged from the phase or ground rectifier bridges 10, 22 as, for example, when a storage battery power supply 29 which is independently charged is used, the negative potential DC outputs of these rectifier bridges 10, 22 can be connected to the positive B+ side of the DC power supply, as illustrated in FIG. 10 rather than to the negative B− side described above and shown in FIG. 1, to thus reduce the burden of the current transfomers T1–T6.

Figure 11:
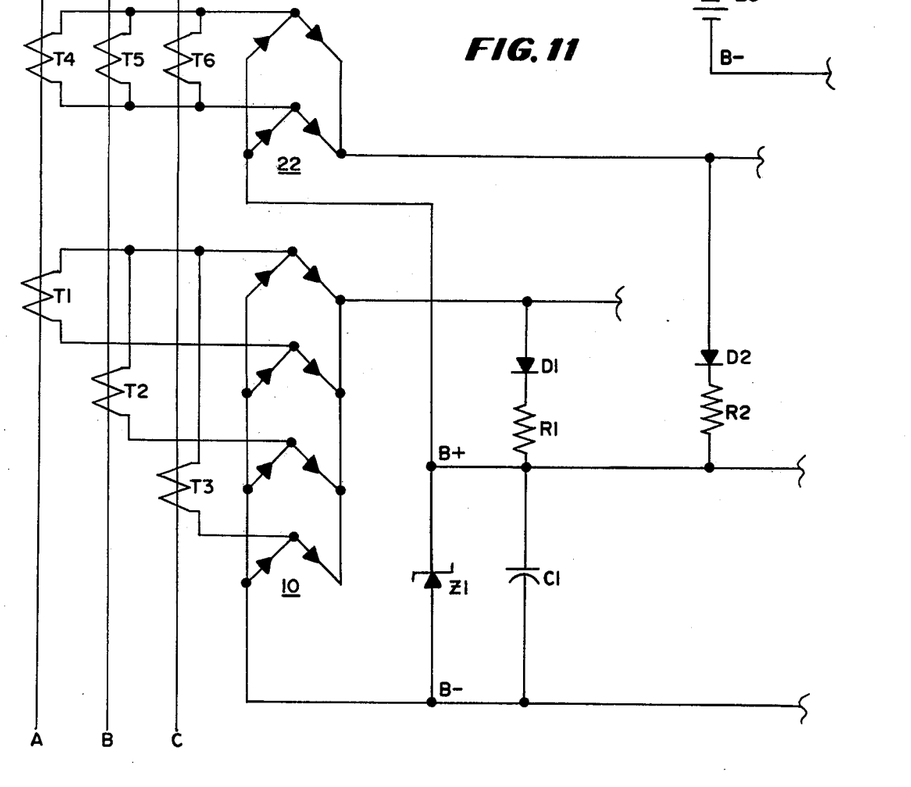
FIG. 11 is a schematic diagram illustrating another modification of the circuit of FIG. 1.

FIG. 11 illustrates another modification of the circuit shown in FIG. 1, in which the negative potential DC output of the ground rectifier bridge 22 is connected to the positive B+ side of the DC power supply, to reduce the burden on the current transformers T4, T5, and T6. In this embodiment, the power supply capacitor C1 is charged solely from the outputs of the phase rectifier bridge 10.

Figure 12:
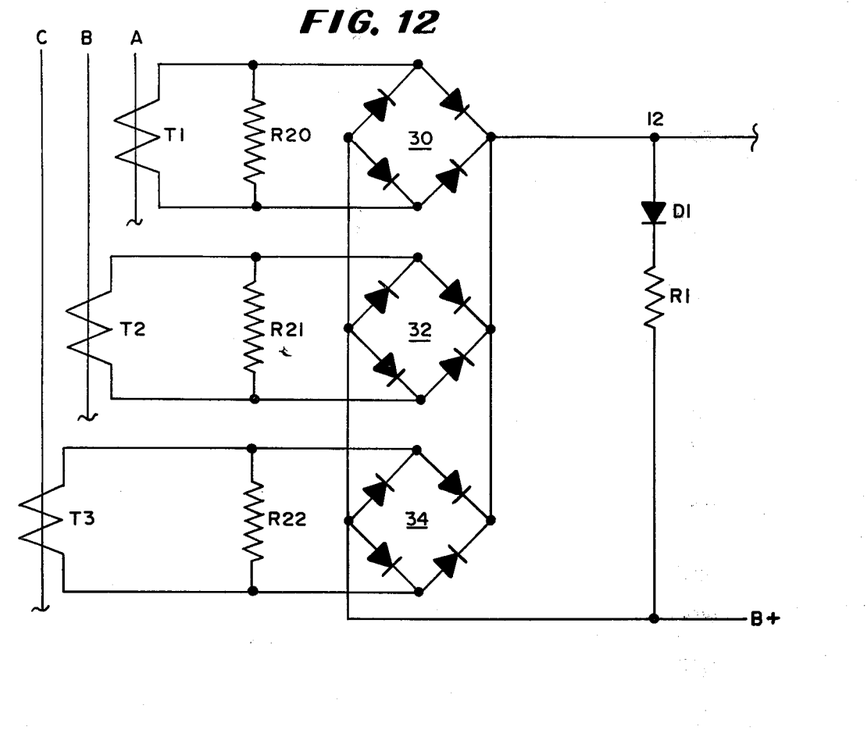
FIG. 12 is a schematic diagram, illustrating the modification of the phase current sensing portion of the circuit of FIG. 1.
Figure 13:
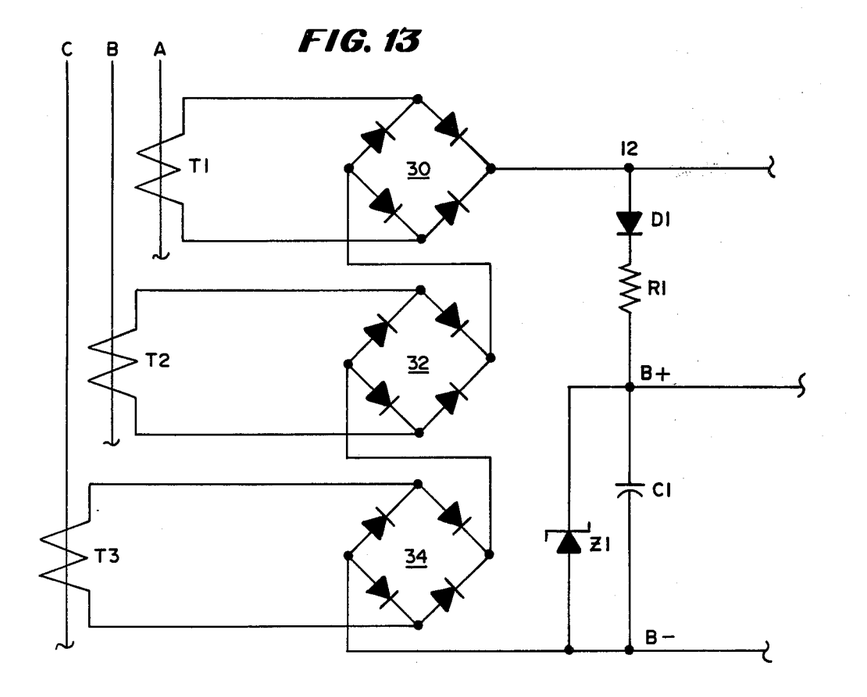
FIG. 13 is a schematic diagram illustrating another modification of the phase current sensing portion of the circuit of FIG. 1.

Other types of phase rectifier bridge circuits, such as those illustrated in FIGS. 12 and 13, can be used instead of the phase rectifier bridge discussed above, so long as the minimum instantaneous value of the phase rectifier bridge output signal produced each current cycle is proportional to the peak value of the median phase current.

The phase rectifier bridge circuit shown in FIG. 12 is similar to that disclosed in U.S. Pat. No. 3,434,011, issued Mar. 18, 1969 to S. E. Zocholl. Each of the phase current transformers T1, T2, T3 has a load resistor R20, R21, R22 connected across it, and the voltage appearing across each of these load resistors R20, R21, R22, is applied to a single phase full-wave rectifier bridge 30, 32, 34. The phase current sensing resistor R1 is connected between the common positive and negative outputs of the three full-wave rectifier bridges 30, 32, 34 so that the instantaneous voltage across the resistor R1 will be proportional to the highest of the instantaneous voltages appearing across the three full-wave rectifier bridges 30, 32, and 34.

The phase rectifier bridge circuit shown in FIG. 13 is similar to that described in U.S. Pat. No. 3,689,801, issued Sept. 5, 1972 to Engel et al. The outputs of the phase transformers T1, T2, T3 are respectively connected to the AC inputs of three single phase full-wave rectifier bridges 30, 32, 34, which have their DC outputs connected in series across the phase current sensing resistor R1 and the power supply capacitor C1. The instantaneous current flowing through the current sensing resistor R1 will be proportional to the highest of the three instantaneous current outputs of the three single phase full-wave rectifier bridges 30, 32, and 34.

In either of the known phase bridge circuits shown in FIGS. 12 and 13, the DC output signals of the three single phase full-wave bridges 30, 32, 34, are combined to provide a single DC output signal, which is substantially equal to the instantaneous largest or highest of the DC output signals of the three single phase full-wave bridges. When the three DC output signals 36, 38, 40 of the rectifier bridges 30, 32, 34, are of equal magnitude and angular displacement, the minimum instantaneous value of the combined output signal 42 will be equal to 0.866 (sine 120°) times the peak value of each phase current signal 36, 38, 40 and will occur six times each current cycle. Under such balanced line conditions, the combined D.C. output signal 42 of the three single phase rectifier bridges 30, 32, 34 will have the same wave form as the output current $I_{12}$ of the phase rectifier bridge 10 described above.

Figure 14:
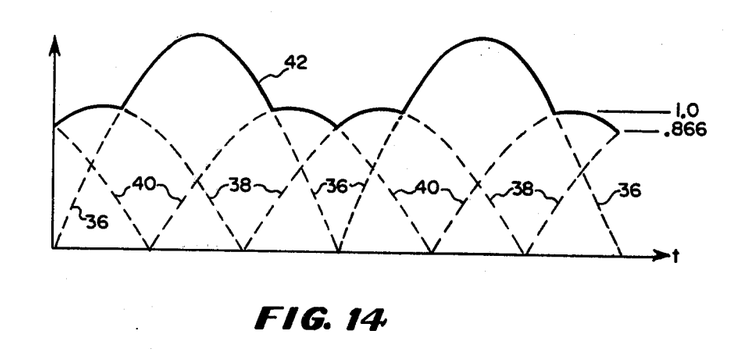
FIGS. 14 and 15 are graphic representations of the instantaneous DC output signals of the phase current rectifier bridge circuits of FIGS. 12 and 13 versus time, for various power line conditions.
Figure 15:
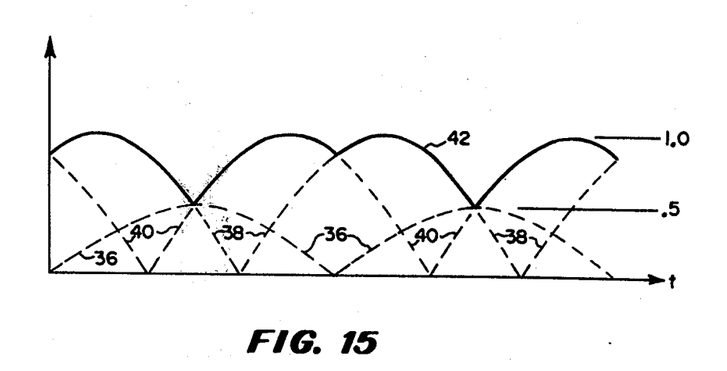

However, since this combined DC output signal 42 does not include a component proportional to the power system ground current, as does the output current $I_{12}$ of the phase rectifier bridge 10, the ratio of the minimum instantaneous value of the combined DC output signal 42 to the peak value of the center magnitude signal of the three phase current signals 36, 38, 40 will vary depending on the relative magnitudes of the three phase current signals. Thus, for a three phase distribution line in which the three phase currents are spaced approximately 120° apart, the ratio of the minimum instantaneous value of the combined DC output signal 42 to the peak value of the center magnitude signal of the three current transformer phase current signals 36, 38, 40, will fall within the range of 0.5 minimum to 0.866 maximum. For example, assuming 120° displacement between the phase currents, if one phase current 36 increases 50% as a result of a downline phase-to-ground fault, the ratio of the minimum instantaneous value of the DC output signal 42 to the peak value of the median phase current signal 38 or 40 is still 0.866, as illustrated in FIG. 14. However, if the phase current 36 decreases 50% as a result of a downline open line condition, the ratio of the minimum instantaneous value of the output signal 42 to the peak value of the median phase current signal 38 or 40 decreases to 0.5, as illustrated in FIG. 15. Consequently, the percentage of the median phase current which the system ground current must exceed to activate the ground pickup circuit 26 is much less when the increase in ground current is caused by an open line condition than when it is caused by a downline phase-to-ground fault. Therefore if the phase current rectifier bridge circuits of this type are used instead of the phase rectifier bridge circuit 10 described above, this ratio variation must be taken into account in properly applying this unbalanced current detection circuit.

Since numerous other modifications, adaptations and variations of the foregoing specific disclosure can be made without departing from the teachings of the present invention, it is intended that the spirit and scope of this invention be limited only by the terms of the appended claims.

What is claimed is:

1. A median phase current detection circuit for a three phase alternating electric power system, which comprises:
   power supply means, having a positive terminal and a negative terminal, for supplying a constant direct voltage between said positive and negative terminals;
   phase current sensing means, which is coupled to the three phase power system and includes a positive output and a negative output, for producing between its two outputs a direct voltage first signal which is proportional to the instantaneous sum of a single polarity portion of the phase and ground currents flowing in said power system; and
   reference signal means, connected to receive said constant direct voltage supplied by said power supply means and said first signal produced by said phase current sensing means, for storing a direct voltage reference signal for at least a half cycle, which follows and approximates in magnitude successive minimum, instantaneous magnitudes of said first signal occurring at least once every half cycle;
   whereby said reference signal is proportional to the median phase current of the three phase power system.

2. A detection circuit, as described in claim 1, which further comprises:
   ground current sensing means, which is coupled to the three phase power system and includes a positive output and a negative output, for producing between its two outputs a direct voltage second signal, which is proportional to the instantaneous magnitude of the three phase power system ground current; and
   output signal means, connected to receive said second signal produced by said ground current sensing means and said reference signal stored by said reference signal means, for producing a direct voltage output signal of at least a half cycle duration each time said second signal momentarily exceeds said reference signal;
   whereby said detection circuit is a relative ground overcurrent detection circuit which produces said output signal whenever the power system ground current exceeds a predetermined percentage of the median phase current.

3. A relative ground overcurrent detection circuit, as described in claim 2, which further comprises:
   time delay circuit means, connected to receive said output signal from said output signal means, for producing a tripping signal after a predetermined time delay following receipt of said output signal; and
   a three phase circuit interrupter for said power system, which includes tripping means, connected to receive said tripping signal produced by said time delay circuit means, for operating said circuit interrupter, said tripping means being activated from said power supply means upon receipt of the tripping signal from said time delay circuit means.

4. A relative ground overcurrent detection circuit as described in claim 2, wherein said phase current sensing means includes:
   three wye-connected current transformers, magnetically coupled to respective phases of the three phase power system, having three phase outputs and a common ground output;
   an eight leg, three phase, rectifier bridge, having
      three AC phase inputs and a ground input connected to the corresponding phase and ground outputs of said wye-connected current transformers,
      a positive DC output, and
      a negative DC output connected to one of said power supply means terminals,
   a first low impedance current path, which is disposed between the two DC outputs of said three phase rectifier bridge and which includes a phase current sensing resistor and a first diode connected in series between the positive DC output of said three phase rectifier bridge and the positive terminal of said power supply means whereby the current flow through, and the voltage across, said phase current sensing resistor is proportional to the instantaneous sum of a single polarity portion of the phase and ground currents flowing in the three phase power system;
   a first PNP transistor having its base connected to the positive terminal of said power supply means;
   a first emitter resistor connected between the emitter of said first transistor and the positive DC output of said three phase rectifier bridge; and
   a first collector resistor connected between the collector of said first transistor and the negative output of said power supply means;
   whereby the forward voltage drop of said first diode compensates for the emitter-to-base voltage drop of said first transistor so that the voltage across said first emitter resistor is equal to the voltage across said phase current sensing means, and the voltage across said first collector resistor constitutes said first signal produced by said phase current sensing means.

5. A relative ground overcurrent detection circuit, as described in claim 4, wherein the power supply means terminal which is connected to the negative DC output of said three phase rectifier bridge is the negative terminal of said power supply means, and said power supply means comprises:
   rechargable power storage means, connected between the two terminals of said power supply means, for supplying said constant direct voltage; and
   voltage limiting means, connected between the two terminals of said power supply means, for maintaining said first low impedance current path when said power storage means is fully charged.

6. A relative ground overcurrent detection circuit, as described in claim 5, wherein said rechargable power storage means is a capacitor.

7. A relative ground overcurrent detection circuit, as described in claim 4, wherein the power supply means terminal which is connected to the negative DC output of said three phase rectifier bridge is the positive terminal of said power supply means.

8. A relative ground overcurrent detection circuit, as described in claim 4, wherein said ground sensing means includes:

three parallel-connected current transformers, magnetically coupled to respective phases of the three phase power system;

a four leg, single phase, full wave, rectifier bridge, having AC inputs connected to respective outputs of said parallel-connected current transformers, a positive DC output, and a negative DC output connected to one of said terminals of said power supply means;

a second low impedance current path, which is disposed between the two DC outputs of said single phase rectifier bridge and which includes a ground sensing resistor and a second diode connected in series between the positive DC output of said single phase rectifier bridge and the positive terminal of said power supply means wherein the current flow through, and the voltage across, said ground sensing resistor is proportional to the instantaneous magnitude of the three phase power system ground current;

a second PNP transistor, having its base connected to the positive terminal of said power supply means;

a second emitter resistor connected between the emitter of said second transistor and the positive DC output of said single phase bridge; and a second collector resistor connected between the collector of said second transistor and the negative terminal of said power supply means;

whereby the forward voltage drop of said second diode compensates for the emitter-to-base voltage drop of said first transistor, so that the voltage across said second emitter resistor is approximately equal to the voltage across said ground current sensing means.

9. A relative ground overcurrent detection circuit, as described in claim 6 wherein said reference signal means includes:

a third PNP transitor having its base connected to the collector of said first transistor, and its collector connected to the negative terminal of said power supply means;

a first reference voltage storage capacitor connected between the emitter of said third transistor and the positive terminal of said power supply means; and a first capacitor discharge resistor connected across said first capacitor, of a selected value such that said first capacitor maintains most of its charge for at least half a cycle.

10. A relative ground overcurrent detection circuit, as described in claim 7, wherein said output signal means includes:

a fourth NPN transistor having its base connected to the collector of said second transistor and its emitter connected to the emitter of said third transistor;

a fifth PNP transistor having its base connected to the collector of said fourth transistor and its emitter connected to the positive terminal of said power supply means;

a second capacitor connected between the collector of said fifth transistor and the negative terminal of said power supply means;

a second capacitor discharge resistor connected on one side to the collector of said fifth transistor; and a sixth NPN transistor having its base connected to the other side of said second capacitor discharge resistor, its emitter connected to the negative terminal of said power supply means, and its collector connected through a limiting resistor to the positive terminal of said power supply means, the values of said second capacitor and said second capacitor discharge resistor being selected so that a momentary turnon of said fifth transistor quickly charges said second capacitor to turn on said sixth transistor, the rate of discharge of said second capacitor, determined by said second capactior discharge resistor, being such that said sixth transistor will remain turned on continuously only so long as said fifth transistor is momentarily turned on at least once every half cycle.

11. A relative ground overcurrent detection circuit, as described in claim 10, wherein;

the connection between the base of said fourth transistor and said second collector resistor includes third and fourth diodes, which are connected in series to conduct from the base of said fourth transistor to said second collector resistor whereby the forward voltage drops of said third and fourth diodes compensates for the emitter-to-base voltage drop of said third transistor and the base-to-emitter voltage drop of said fourth transistor.

12. A relative ground overcurrent detection circuit, as described in claim 2, wherein said reference signal means includes:

a first PNP transistor having its base connected to the positive output of said phase current sensing means, and having its collector connected to the negative output of said phase current sensing means and to the negative terminal of said power supply means;

a first reference voltage storage capacitor connected between the emitter of said first transistor and the positive terminal of said power supply means; and a first capacitor discharge resistor connected across said first capacitor, of a selected value such that said first capactior maintains most of its charge for at least half a cycle.

13. A relative ground overcurrent detection circuit, as described in claim 12, wherein said output signal means includes:

a second NPN transistor having its emitter connected to the emitter of said first transistor;

two diodes, connected in series to conduct from the base of said second transistor to the positive output of said ground current sensing means, whereby the forward voltage drop of said two diodes compensates for the emitter-to-base voltage drop of said first transistor and the base-to-emitter drop of said second transistor;

a third PNP transistor having its base connected to the collector of said second transistor and its emitter connected to the positive terminal of said power supply means;

a second capacitor connected between the collector of said third transistor and the negative terminal of said power supply means;

a second capacitor discharge resistor connected on one side to the collector of said third transistor; and a fourth NPN transistor having its base connected to the other side of said second capacitor discharge resistor, its emitter connected to the negative terminal of said power supply means, and its collector connected through a limiting resistor to the positive terminal of said power supply means, the values of said second capacitor and said second capacitor discharge resistor being selected so that a momentary turn on of said third resistor quickly charges said second capacitor to turn on said fourth transistor, the rate of discharge of said second capacitor, determined by said second capacitor discharge resistor, being such that said fourth transistor will remain turned on continuously only so long as said third transistor is momentarily turned on at least once every half cycle.

14. A median phase current detection circuit for a three phase alternating electric power system, which comprises:

power supply means, having a positive terminal and a negative terminal, for supplying a constant direct voltage across said terminals;

phase current sensing means, which is coupled to the three phase power system, for producing a direct voltage first signal whose instantaneous magnitude is proportional to the instantaneously largest magnitude of the three phase currents of the three phase power system; and reference signal means, connected to receive said constant direct voltage supplied by said power supply means and said first signal produced by said phase current sensing means, for storing a direct voltage reference signal for at least a half cycle, which follows and approximates in magnitude successive, minimum, instantaneous magnitudes of said first signal occurring at least once every half cycle;

whereby said reference signal is proportional to the median phase current of the three phase power system.

15. A detection circuit, as described in claim 14, which further comprises:

ground current sensing means, coupled to the three phase power system, for producing a direct voltage second signal, which is proportional to the instantaneous magnitude of the three phase power system ground current;

output signal means, connected to receive said second signal produced by said ground current sensing means and said reference signal stored by said reference signal means, for producing a direct voltage output signal of at least a half cycle duration each time said second signal momentarily exceeds said reference signal;

whereby said detection circuit is a relative ground overcurrent detection circuit which produces said output signal whenever the power system ground current exceeds a predetermined percentage of the median phase current.

16. A median phase current detection circuit for a three phase alternating electric power system, which comprises:

power supply means, having a positive terminal and a negative terminal, for providing a constant direct voltage between said terminals;

phase current sensing means, which is coupled to the three phase power system and includes a positive output and a negative output, for producing between said outputs a direct voltage first signal having minimum instantaneous magnitudes which occur at least once every half cycle and which are proportional to the median phase current of the three phase power system, a first output of the two phase current sensing means outputs being coupled to a first terminal of the same polarity of the two power supply means terminals;

a reference voltage capacitor, having a first side and a second side, the second side of said capacitor being connected to the second terminal of said power supply means;

capacitor switching means, for connecting the first side of said capacitor to the first terminal of the two power supply means terminals to quickly charge said capacitor whenever and for as long as the voltage between the second output of the two phase current sensing means outputs and the second terminal of the two power supply means terminals is greater than the voltage across said capacitor;

said capacitor switching means having a first switch terminal connected to the first side of said capacitor, a second switch terminal connected to the first terminal of the two power supply means terminals, and a control terminal connected to the second output of the two phase current sensing terminals; and capacitor discharge resistive means, connected across said capacitor, for slowly discharging said capacitor so that said capacitor maintans most of its charge for at least half a cycle;

whereby the voltage between the first side of said capacitor and the first terminal of said power supply means follows and approximates in magnitude the minimum instantaneous magnitudes of said first signal occurring at least once every half cycle, and constitutes a reference signal which is proportional to the median phase current of the three phase power system.

17. A relative ground overcurrent detection circuit for a three phase alternating electric power system, which comprises:

power supply means for providing a constant direct voltage signal;

phase current sensing means, coupled to the three phase power system, for producing a direct voltage first signal having minimum, instantaneous magnitudes which occur at least once every half cycle and which are proportional to the median phase current of the three phase power system;

reference signal means, connected to receive said constant direct voltage signal supplied by said power supply means and said first signal supplied by said phase current sensing means, for storing a direct voltage reference signal, for at least a half cycle, which follows and approximates in magnitude successive, minimum instantaneous magnitudes of said first signal occurring at least once every half cycle;

ground current sensing means, coupled to the three phase power system, for producing a direct voltage second signal which is proportional to the instantaneous magnitude of the ground current of the three phase power system; and output signal means, connected to receive said second signal produced by said ground current sensing means and said reference signal stored by said reference signal means, for producing a direct voltage output signal of at least a half cycle duration each time said second signal momentarily exceeds said reference signal;

whereby the relative ground overcurrent detection circuit produces said output signal whenever the ground current of the three phase power system exceeds a predetermined percentage of the median phase current of the three phase power system.

* * * * *